Jan. 3, 1933.   E. H. STEEDMAN   1,893,185
AUTOMOBILE LIFT
Filed May 5, 1930   2 Sheets-Sheet 1
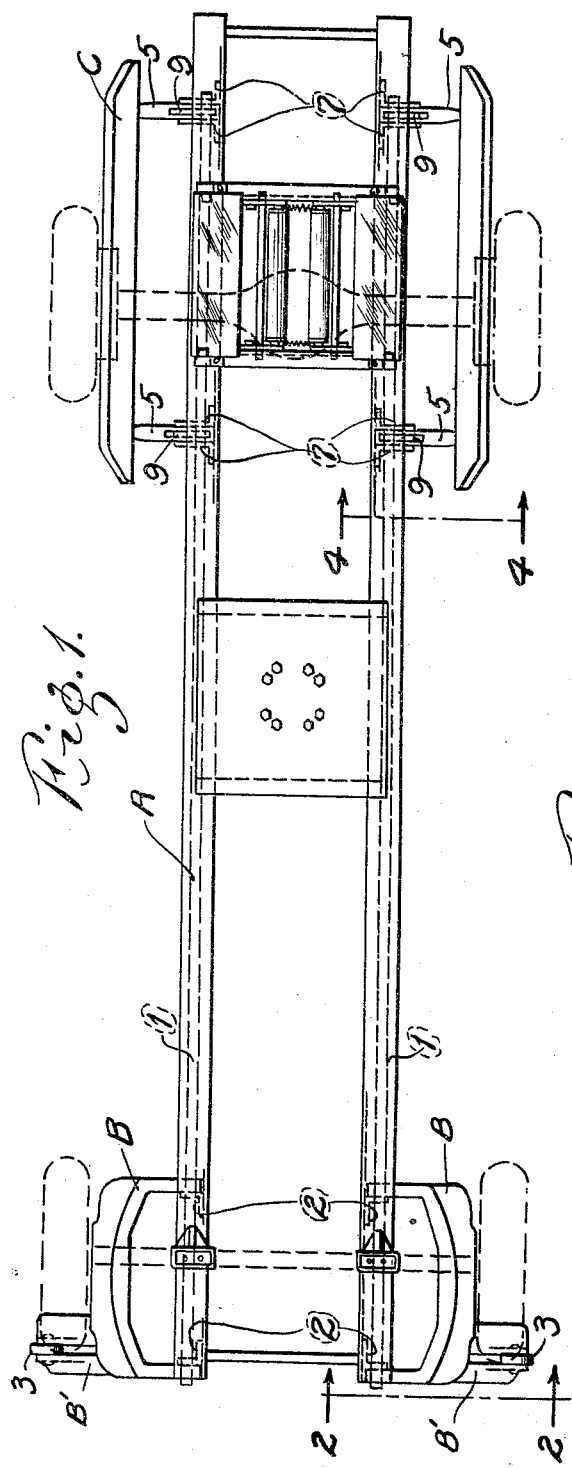
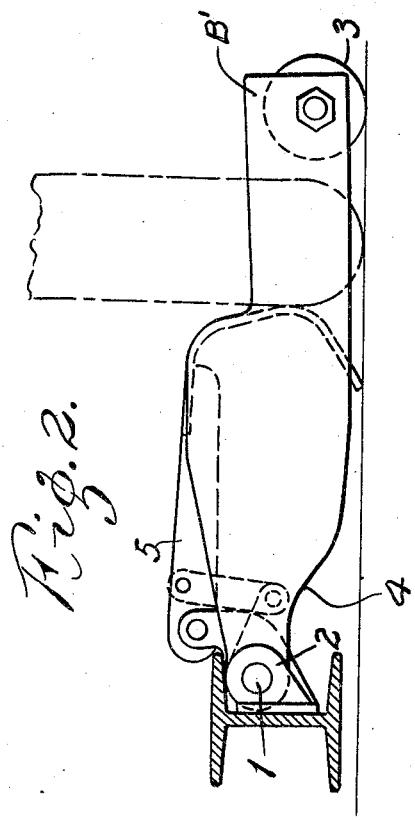
INVENTOR:
EDWIN H. STEEDMAN.
BY Bakewell & Church
ATTORNEYS.

Jan. 3, 1933.     E. H. STEEDMAN     1,893,185
AUTOMOBILE LIFT
Filed May 5, 1930     2 Sheets-Sheet 2

INVENTOR:
EDWIN H. STEEDMAN.
BY Bakewell & Church
ATTORNEYS.

Patented Jan. 3, 1933

1,893,185

UNITED STATES PATENT OFFICE

EDWIN H. STEEDMAN, OF ST. LOUIS, MISSOURI, ASSIGNOR TO CURTIS MANUFACTURING COMPANY, OF WELLSTON, MISSOURI, A CORPORATION OF MISSOURI

AUTOMOBILE LIFT

Application filed May 5, 1930. Serial No. 449,845.

This invention relates to automobile lifts of the type that comprise an upwardly-movable platform equipped with shiftable wheel engaging members that are adapted to co-operate with wheels on an automobile that is being raised, to center the automobile with relation to the platform when the automobile is driven or moved over the platform preparatory to lifting or raising the automobile, said wheel engaging members being so constructed and arranged that they can move or be moved out of engagement with the wheels when the platform is in its raised position, so as to permit the wheels to rotate or turn freely.

One object of my present invention is to provide an automobile lift of the general type mentioned that is equipped with shiftable wheel engaging members, so constructed or arranged that when they are in their inactive position, they will be spaced far enough away from the wheels with which they co-operate to provide ample clearance for a workman who is performing some operation on the wheels or adjacent parts of the chassis, and when the platform is restored to its lowered position, said wheel engaging members will be sure to be returned to their active position, so as to be in readiness to co-act properly with the wheels of the next automobile that is driven or moved over the platform.

Another object is to provide an automobile lift that comprises a platform which is adapted to be moved upwardly so as to sustain an automobile in an elevated position, shiftable wheel engaging members carried by said platform and mounted so as to be capable of assuming two different positions, in one of which they are adapted to co-act with wheels of the automobile that is to be raised, to center the automobile with relation to the platform, and an operating mechanism for positively moving or shifting said wheel engaging members to change the position of same. Other objects and desirable features of my invention will be hereinafter pointed out.

Figure 1 of the drawings is a top plan view of an automobile lift constructed in accordance with my invention.

Figure 2 is a fragmentary front elevational view, taken on the line 2—2 of Figure 1, looking in the direction indicated by the arrows, showing the front and rear wheel engaging members on one side of the platform in their active or operative position.

Figure 3:
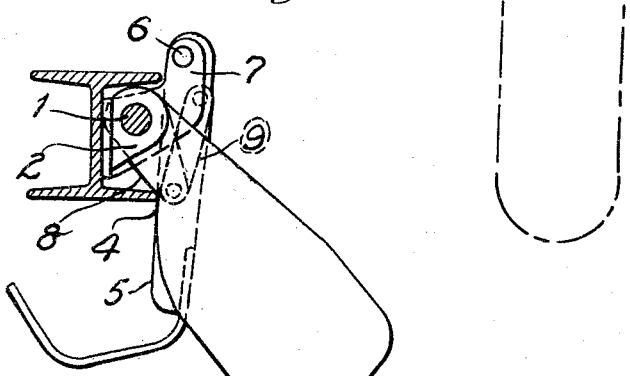
Figure 3 is a view similar to Figure 2, showing the said wheel engaging members in their inactive or inoperative position.

In the accompanying drawings which illustrate the preferred form of my invention, A designates the platform of the lift, which may be of any preferred construction and combined with any suitable kind of mechanism for raising and lowering said platform. Usually, the platform A will consist of a relatively long and narrow frame of less width than the tread of the conventional automobile and said frame will be connected to the upper end of a vertically-disposed piston (not shown) that reciprocates in a cylinder set in a foundation or base on which the platform rests when it is in its lowered position, the platform being adapted to be raised by admitting an operating medium to said cylinder and lowered by permitting the operating medium to escape from said cylinder. In the form of my invention herein illustrated, the platform A is provided adjacent its front and rear ends with front and rear wheel engaging members B and C, respectively, that are used to center an automobile with relation to the platform during the operation of moving the automobile over the platform preparatory to raising the same. When the platform is in its lowered position the wheel engaging members B and C project laterally from the platform A, as shown in Figure 1, and occupy such a position that they will co-act with the tires on the wheels of the automobile to center the automobile with relation to the platform. The front wheel engaging members B are herein illustrated as being provided with laterally-projecting arms B', that co-act with the ground or base of the structure to restore the members B to a horizontal position when the platform is being lowered, as hereinafter described. These arms B' also serve as chocks or abutments that co-operate with the front wheels of the automobile to arrest the forward movement of the automobile when it is being moved over the platform, thereby causing the front axle of the automobile to register properly with chassis engaging devices on the platform on which the automobile rests when the platform is in its raised or elevated position. The wheel engaging members B and C are so constructed or arranged that they will move or may be moved into an inactive position when the platform is raised, so as to permit the wheels of the automobile to turn or rotate freely.

In automobile lifts of the general type above described it is often necessary to work on the wheels, brake drums and adjacent parts of the chassis when the platform is in its raised position. As the front wheels of the automobile can be cramped or moved into angular relationship with the side members of the platform A by manipulating the steering wheel of the automobile, it is not essential that the front wheel engaging members B be mounted on the platform in such a way that they can move or be moved a relatively great distance away from the front wheels when said members are shifted into their inactive position, for even if the front wheel engaging members are arranged in comparatively close proximity to the front wheels when the platform is raised, it is possible for a mechanic to easily get at the front brake drums, steering knuckles and adjacent parts of the chassis simply by cramping the front wheels. Hence, it is practicable or feasible to simply pivotally mount the front wheel engaging members on the platform in such a way that when the platform moves upwardly, said members will swing downwardly out of engagement with the front wheels and come to rest in an inclined position, wherein they will be sure to be restored to their active position or horizontal position by the engagement of the laterally-projecting arms B' thereon with the ground or the base of the structure when the platform is thereafter restored to its lowered position. A different problem is presented, however, with the rear wheel engaging members C, due to the fact that the rear wheels of the automobile must always remain in parallel relationship with the side members of the platform A, thus providing a working space of relatively restricted size for a mechanic who is working on the rear wheels, brake drums or adjacent parts of the chassis. In other words, if the rear wheel engaging members are pivotally mounted on the platform in such a way that gravity causes said members to swing downwardly out of engagement with the rear wheels, when the platform moves upwardly, and if stops, abutments or other means be employed to hold said rear members in such a position that they will not interfere with the downward movement of the platform when the platform is thereafter lowered, it is difficult for a mechanic to work on the rear brake drums and adjacent parts of the chassis, due to the fact that the slightly downwardly inclined position which the rear wheel engaging members assume when they are in their inactive position seriously hampers a mechanic who is working on a rear brake drum or on an adjacent part of the chassis at the inside of a rear wheel.

In order to produce an automobile lift of the type that is equipped with shiftable wheel engaging members, but which is of such design that ample space or clearance is provided at the inner sides of all of the wheels of an automobile sustained in an elevated position by the platform, I propose to equip automobile lifts of the general type mentioned with a pair of shiftable wheel engaging members that are connected with an operating mechanism, by means of which said members may be shifted a relatively great distance away from the wheels with which they co-operate when the platform of the lift is in its raised position, thereby providing ample clearance around the wheels and may be shifted back to their operative position so as to not interfere with the downward movement of the platform when the platform is thereafter restored to its lowered position. Said operating mechanism may be of the type that is adapted to be manually operated, or it may be of the type that is intended to be operated in one direction by gravity during the upward movement of the platform and be operated in the opposite direction by the engagement of a part on the platform with the base of the structure during the downward movement of the platform. In the automobile lift herein shown the front wheel engaging members are mounted in such a way that they will swing downwardly slightly and come to rest in a slightly downwardly-inclined position when the platform moves upwardly, and the swinging movement of said front wheel engaging members is used to actuate an operating mechanism that causes the rear wheel engaging members to be shifted a relatively great distance away from the rear wheels during the upward movement of the platform and to be restored automatically to their active position, so as to not interfere with the downward movement of the platform when the platform moves downwardly to its lowered position. I wish it to be understood, however, that my invention is not limited to an automobile lift of the particular construction herein illustrated, as my present invention, briefly stated, simply consists in the combination in an automobile lift of an upwardly-movable platform, shiftable wheel engaging members carried by said platform and adapted to co-operate with wheels on an automobile that is to be raised to center the automobile relatively to the platform, and an operating mechanism of any suitable kind for actuating or shifting said members relatively to the platform so as to permit said members to be spaced relatively far away from the wheels with which they co-operate when the platform is raised, without liability of said members interfering with the downward movement of the platform when the platform is thereafter restored to its lowered position.

The front wheel engaging members B have their inner ends pivotally connected to the side members of the platform A preferably by long rods 1 that extend longitudinally of the platform and which pass through holes in the inner ends of the members B and holes in brackets 2 that project laterally from the side members of the platform. At the outer ends of the wheel chocks B' on the front wheel engaging members B are rollers 3 that are adapted to contact with the base over which the platform is arranged, so as to automatically restore the front wheel engaging members to their active position when the platform A is lowered. Said front wheel engaging members B are so shaped that when the platform A moves upwardly said members B will swing downwardly into a slightly inclined position and come to rest with shoulders or abutment surfaces 4 on said members contacting with the side members of the platform A, as shown in Figure 3.

Figure 5:
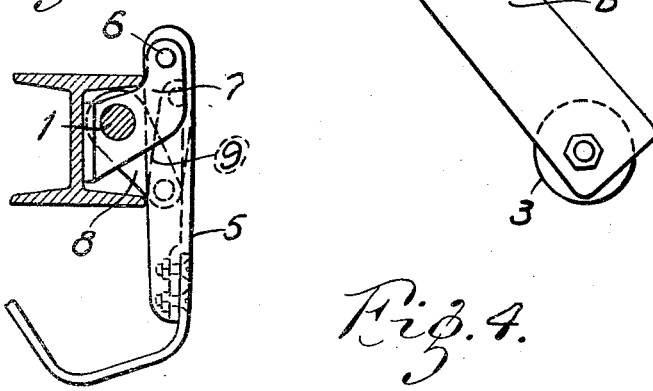
Figure 5 is a view similar to Figure 4, showing said rear wheel engaging member in its inactive position.
Figure 4:
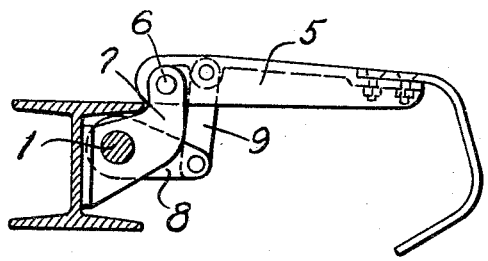
Figure 4 is a view, taken on the line 4—4 of Figure 1, looking in the direction indicated by the arrows, showing the rear wheel engaging member at one side of the platform in its active position.

The rear wheel engaging members C, which may be of any preferred form, are each provided with a pair of arms 5 whose inner ends are pivotally connected by pivots 6 to brackets 7 on the side members of the platform A, attention being called to the fact that the pivots 6 of the rear wheel engaging members C are located in a higher horizontal plane than the pivots 1 of the front wheel engaging members B. The longitudinally-disposed rods 1, previously referred to, that serve as pivot pins for the front wheel engaging members B, are rigidly connected to said members so as to cause said rods to rock or oscillate in one direction when the front wheel engaging members swing downwardly into the position shown in Figure 3 and to rock or oscillate in the opposite direction when said front wheel engaging members are restored to their active or operative position shown in Figure 2. The rocking or oscillating movement of these rods 1 is used to positively shift the rear wheel engaging members C into an inactive position, as shown in Figures 3 and 5, when the platform A moves upwardly, and to positively restore said rear wheel engaging members to their active position, shown in Figures 2 and 4, when the platform A is thereafter moved downwardly into its lowered position on the base of the structure. It is immaterial how the rods 1 are operatively connected with the rear wheel engaging members C, but I prefer to provide each of said rods with a rigid arm 8 (see Figure 4) that is joined by a link 9 to the rear wheel engaging member C with which said rod co-operates, it being desirable to make the arm 8 and link 9 of such length, and pivotally connect said link to the wheel engaging member C at such a point, that a relatively slight movement of the front wheel engaging member B attached to the rod will impart a relatively great movement to the rear wheel engaging member, and thus cause said rear member to be shifted into a position directly under the platform A and spaced a considerable distance away from the rear wheel when the front wheel engaging member shifts into its inactive position, as shown in Figure 3. Likewise, the relatively slight arc through which the front wheel engaging member moves when it is restored to its active position by engagement of the roller 3 on same with the base of the structure, causes the rear wheel engaging member to move through an arc of approximately 90° from its inactive position, shown in Figure 5, into its active position, shown in Figure 4, thereby preventing the rear wheel engaging members of the lift from interfering with the downward movement of the platform and insuring said rear wheel engaging members being positioned properly on the base by the time the platform reaches its fully lowered position.

Having thus described my invention, what I claim as new and desire to secure by Letters Patent is:

1. An automobile lift, comprising an upwardly-movable platform over which an automobile is adapted to be positioned, shiftable front and rear wheel engaging members carried by the platform, one pair of said wheel engaging members being so mounted that when the platform moves upwardly said members will be moved by gravity into an inactive position, and means for utilizing the movement of said gravity-operated members for moving the other pair of wheel engaging members into an inactive position.

2. An automobile lift, comprising an upwardly-movable platform over which an automobile is adapted to be positioned, front and rear wheel engaging members rockably mounted on said platform, operating rods on the platform rigidly connected to and adapted to be rocked by one pair of wheel engaging members, and means for utilizing the rocking movement of said operating rods to move the other pair of wheel engaging members through an arc of considerably greater length than the arc of movement of the members which actuate said rods.

3. An automobile lift, comprising an upwardly-movable platform over which an automobile is adapted to be positioned, two pairs of wheel engaging members rockably mounted on said platform, one pair of said wheel engaging members being adapted to be moved by gravity into an inactive position wherein said members are so disposed as to not interfere with the downward movement of the platform when it is restored to its lowered position, and means for utilizing the movement of said gravity-operated members to move the other pair of wheel engaging members into an inactive position beneath the platform and for thereafter withdrawing said members from underneath the platform so as to not interfere with the downward movement of same.

4. An automobile lift, comprising an upwardly-movable platform over which an automobile is adapted to be positioned, front and rear wheel engaging members pivotally mounted on the platform and adapted to occupy an active position wherein they project laterally from the platform when said platform is in its lowered position, means for preventing the front wheel engaging members from swinging downwardly underneath the platform when the platform moves upwardly, and means for utilizing the movement of the front wheel engaging members to shift the rear wheel engaging members into an inactive position beneath the platform and to thereafter restore said rear members to their active position before the platform reaches its lowered position.

5. An automobile lift, comprising an upwardly-movable platform over which an automobile is adapted to be positioned, front and rear wheel engaging members pivotally mounted on said platform and adapted to occupy an active position wherein they project laterally from the platform when the platform is in its lowered position, operating rods extending longitudinally of the platform and rigidly connected with said front wheel engaging members, and arms on said rods connected by links with said rear wheel engaging members, for the purpose described.

6. An automobile lift, comprising an upwardly-movable platform over which an automobile is adapted to be positioned, front and rear wheel engaging members pivotally mounted on said platform and adapted to project laterally from same when the platform is in its lowered position, the pivots of the rear wheel engaging members being located in a higher horizontal plane than the pivots of the front wheel engaging members, longitudinally-disposed operating rods rockably mounted on the platform and adapted to be rocked by movement of one pair of wheel engaging members, and means for transmitting movement from said operating rods to the other pair of wheel engaging members.

7. An automobile lift, comprising an upwardly-movable platform over which an automobile is adapted to be positioned, front and rear wheel engaging members carried by the platform and adapted to occupy an active position wherein they project laterally from the platform when the platform is in its lowered position, operating rods disposed longitudinally of the platform and rockably mounted in bearings thereon, the front wheel engaging members being rigidly connected to said rods, means for pivotally mounting the rear wheel engaging members on the platform, and means for utilizing the movement of said rods through a short arc to move the rear wheel engaging members through a long arc.

EDWIN H. STEEDMAN.